April 29, 1941.   J. H. MEECH   2,239,968
CLUTCH
Filed Dec. 8, 1937   3 Sheets-Sheet 1
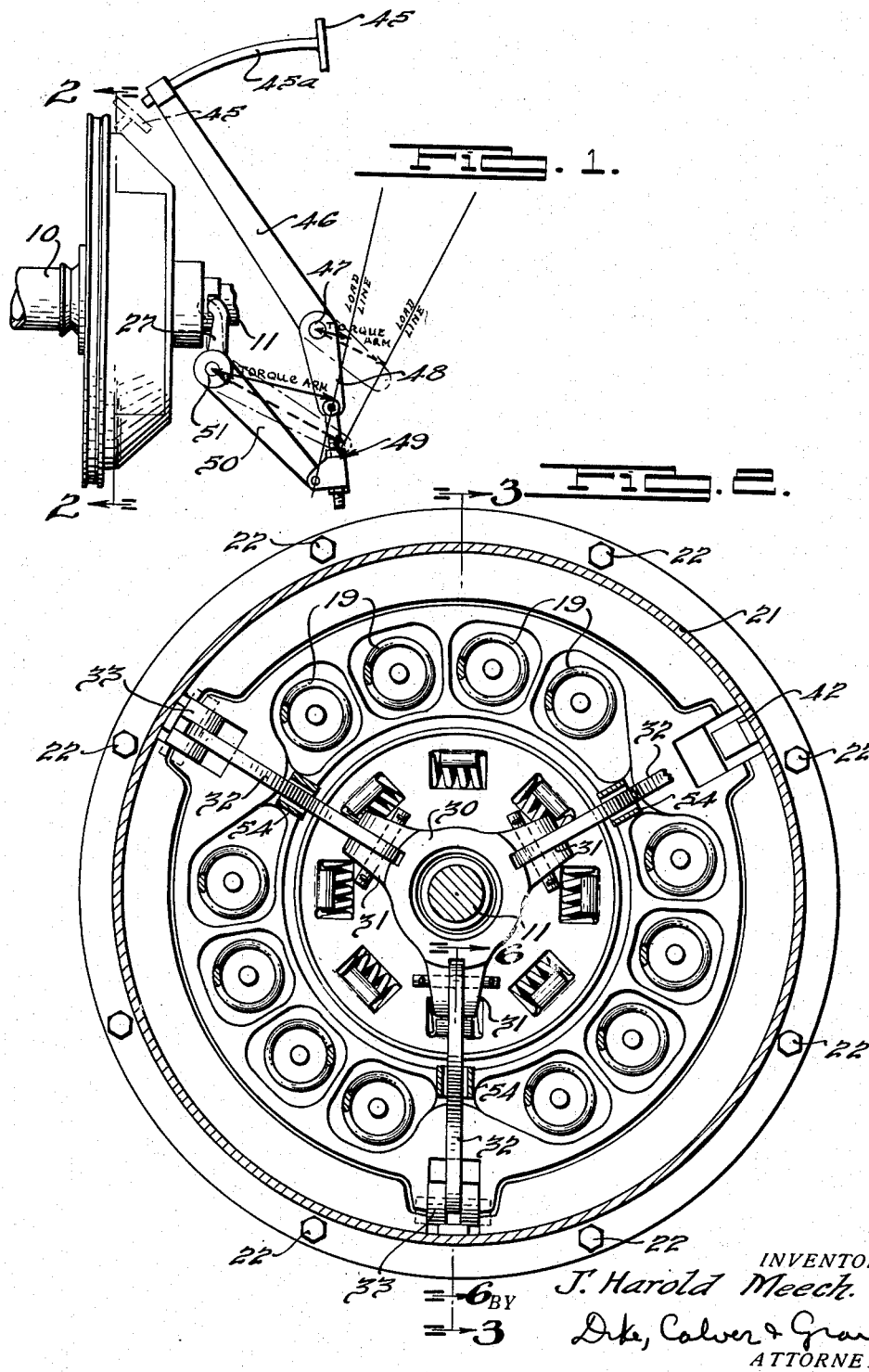
INVENTOR
J. Harold Meech.
BY
Dike, Calver & Gray
ATTORNEYS.

April 29, 1941.  J. H. MEECH  2,239,968
CLUTCH
Filed Dec. 8, 1937  3 Sheets-Sheet 2
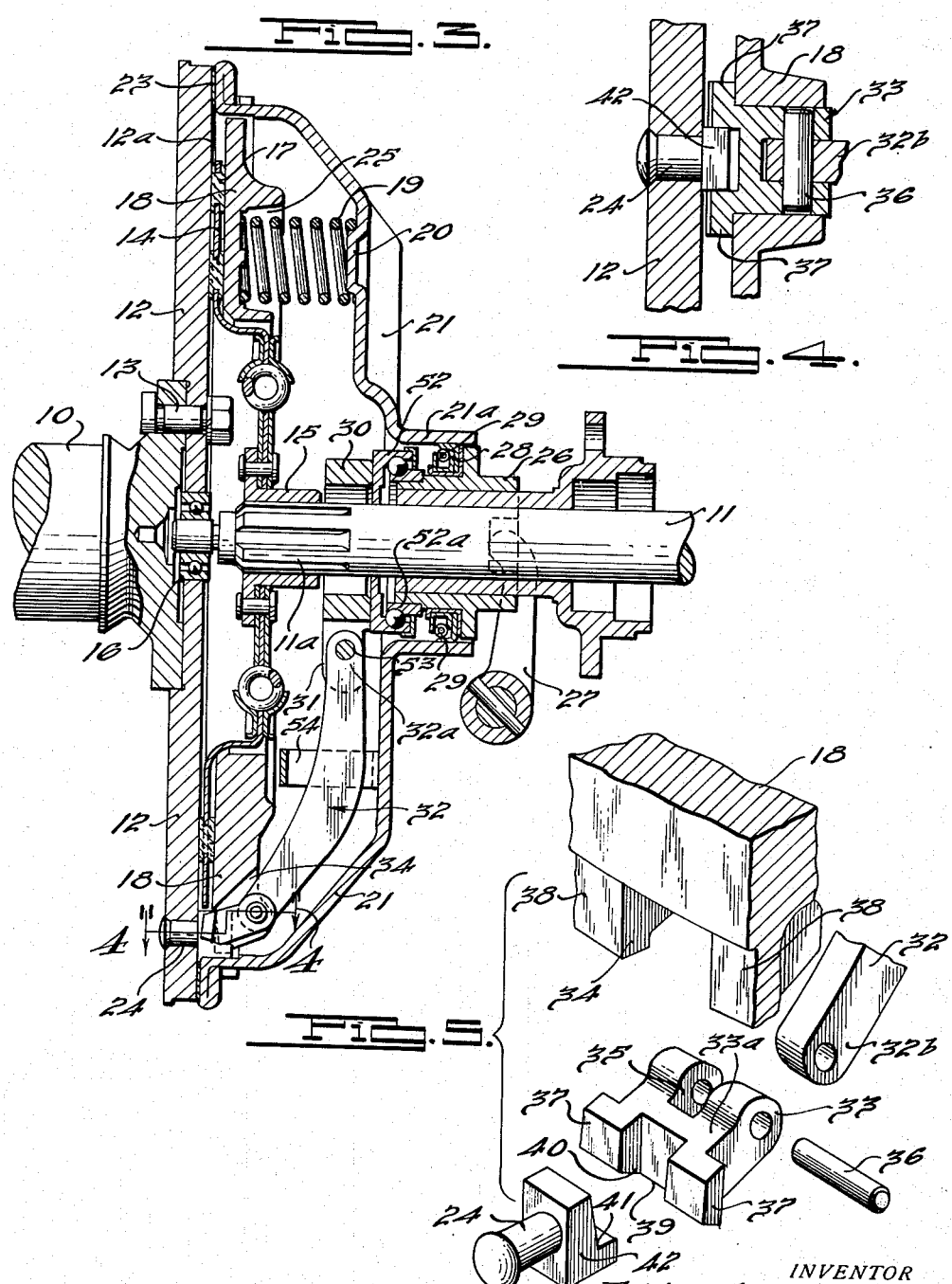

April 29, 1941.    J. H. MEECH    2,239,968
CLUTCH
Filed Dec. 8, 1937    3 Sheets-Sheet 3
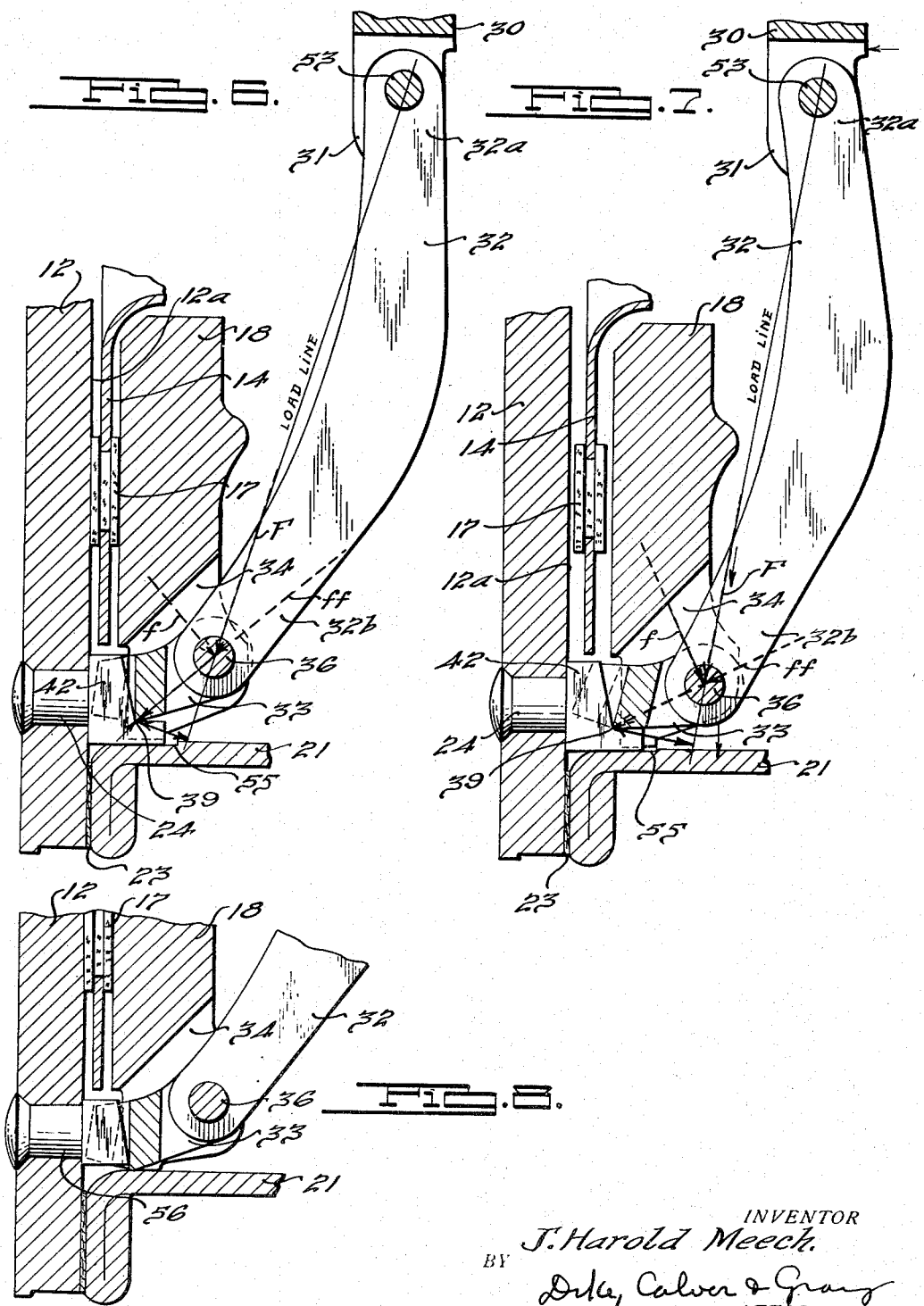
INVENTOR
J. Harold Meech.
BY
Dilley, Calver & Gray
ATTORNEYS.

Patented Apr. 29, 1941

2,239,968

UNITED STATES PATENT OFFICE 2,239,968

CLUTCH

James Harold Meech, Detroit, Mich., assignor to Hudson Motor Car Company, Detroit, Mich., a corporation of Michigan Application December 8, 1937, Serial No. 178,673

11 Claims. (Cl. 192—68)

This invention relates to clutches and more particularly to clutches used in motor vehicles such as automobiles.

One of the difficulties arising from conventional construction of motor vehicle clutches results from the fact that release fingers thereof are fulcrumed on the clutch cover usually made of pressed metal, in consequence whereof the high operative forces resulting at the fulcrum points of the release fingers produce high deflection of the cover, thus causing such relative movement of the clutch parts as to produce increased friction and often binding of the clutch parts. Such objectionable phenomenon is usually amplified still further by the fact that the release fingers of conventional clutches, being long and thin members (to reduce the weight) are made to operate as beams, that is, transversely loaded members, and they deflect or bend under said loads so much as to change very considerably the operation of the clutch mechanisms.

One of the objects of the present invention is to provide an improved clutch for a motor vehicle, in which means are provided to prevent the deflection of the operative parts thereof, rigidity of said parts being greatly increased without increasing their weight.

Another object of the invention is to provide a motor vehicle clutch having a cover and a release mechanism, the latter being so arranged with respect to the cover that no direct pressure is exerted by the operative parts of the mechanism on said cover, whereby objectionable deflection of the cover is prevented.

A further object of the invention is to provide a motor vehicle clutch having a release mechanism with a number of release fingers, said fingers being adapted to be subjected in operation to compression, rather than to bending, as in previous constructions, whereby undesirably high deflection of said fingers is eliminated.

A still further object of the invention is to provide a clutch device having a release mechanism including a number of release fingers and a pressure collar cooperating therewith, the fingers being self-aligning and, therefore, adapted to transmit uniformly even loads.

A still further object of the invention is to provide a clutch device, in which the force necessary for its operation remains substantially uniform throughout the entire range of the actuating movement of the clutch operating member, such for instance as a clutch pedal.

Still another object of the invention is to provide an improved motor vehicle clutch having a pressed metal cover and a release mechanism, said release mechanism being so constructed that deflection of the cover does not affect the operation of the release mechanism.

Still another object of the invention is to provide a motor vehicle clutch in which the operative parts of the release mechanism have their fulcrum points on substantially rigid members and in which the pressure resulting from the operation of the device is finally carried by some substantially unflexible part of the vehicle structure, such, for instance, as the flywheel of the vehicle engine.

It is an added object of the present invention to provide a clutch of the foregoing character, which is simple in construction and dependable in operation, and which is relatively inexpensive to manufacture.

Other objects of this invention will appear in the following description and appended claims, reference being had to the accompanying drawings forming a part of this specification wherein like reference characters designate corresponding parts in the several views.

Fig. 1 is a side view of a clutch for a motor vehicle embodying the present invention, including the pedal mechanism therefor.

Fig. 2 is a view, partly in section, taken on the line 2—2 of Fig. 1, looking in the direction of the arrows.

Fig. 3 is a view showing a longitudinal vertical section through the clutch structure, the section being taken on the line 3—3 of Fig. 2.

Fig. 4 is a fragmentary sectional view taken on the broken line 4—4 of Fig. 3, looking in the direction of the arrows.

Fig. 5 is an exploded view of the clutch throwout lever and parts cooperating therewith.

Fig. 6 is a view illustrating the clutch throwout mechanism, the parts thereof being shown in the positions assumed thereby when the clutch is engaged.

Fig. 7 is a view similar in part to Fig. 6, the parts of the throwout mechanism being shown in the positions for disengagement of the clutch.

Fig. 8 illustrates a modified construction of the throwout mechanism and particularly of the lever-supporting stud thereof.

Before explaining in detail the present invention, it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle clutch embodying the present invention. It will be understood, however, that the invention is not limited to motor vehicle clutches or to friction clutches, but it may be advantageously used in connection with clutches of other types, such as with positive clutches, employed wherever disengageable connection between two abutting shafts is desired.

In the embodiment illustrated in the drawings, the clutch device shown therein is intended for disengageably connecting a crankshaft 10 of a vehicle engine and the transmission shaft 11. The crankshaft 10 has a flywheel 12 secured thereto with the aid of bolts 13, the flywheel being provided with a smooth surface 12a for frictionally engaging the driven member of the clutch. Thus, the flywheel 12 constitutes the driving member of the clutch device.

The driven element of the clutch device is exemplified in the present embodiment by a driven disk 14 secured to an internally splined hub 15 mounted on the externally splined end 11a of the driven or transmission shaft 11, the end 11a of said shaft being supported in the pilot bearing 16 pressed into the center of said flywheel 12. The friction surfaces of the driven disk may, for example, be formed by a number of cork inserts 17 or other suitable friction material arranged on said driven disk as is well known in the art. When the driven disk is pressed against the driving frictional surface of the flywheel, torque or rotating effort may be transmitted from the crankshaft 10 to the transmission shaft 11, the exact magnitude whereof depends upon the coefficient of friction of the materials in actual surface contact, the magnitude of the pressing force and the location thereof with respect to the axes of the shafts.

Means for keeping the driven disk 14 in contact under pressure with the driving surface of the flywheel are exemplified in the present embodiment by a pressure plate 18 bearing against the driven disk 14 and pressed against the same by the action of a plurality of compression springs 19 arranged equidistantly around said pressure plate. In the present embodiment twelve springs arranged in three groups of four springs each are employed, see Fig. 2. The springs 19 are supported on the bosses 20 formed preferably by stamping on the sheet metal cover 21 secured to the flywheel 12 with the aid of a plurality of bolts 22, a gasket 23 being provided between the flywheel and the cover.

The pressure plate 18 is adapted to rotate with the flywheel 12, being driven therewith by a plurality of lugs or studs 24 provided on the flywheel 12 and engaging said plate 18 at radial slots provided on the outside edge thereof. The cover 21 being bolted or otherwise secured to the flywheel 12 rotates therewith, as well as do the springs 19 held on the bosses 20 at their ends adjacent to the cover, the opposite ends entering nests 25 formed on the pressure plate 18. Thus, the flywheel 12, the cover 21, the springs 19 and the pressure plate 18 rotate as a unit, and unless the pressure plate 18 is drawn from the frictional surface 12a of the flywheel 12, the springs 19 will press it firmly toward said surface, and the driven disk 14 will be held firmly between the flywheel 12 and the pressure plate 18 thus providing the necessary frictional engagement between the driving surfaces of the flywheel and the pressure plate and the driven surfaces of the disk 14. When such a frictional engagement is effected because of the action of the spring 19, the driven disk 14 and the driven shaft 11 rotate with the driving shaft 10.

In addition to the function of supporting the spring 19, the cover 21 together with the flywheel 12 serves as a container for the bath of oil in which the driven disk 14 rotates. In order to prevent leakage of the oil past the driven shaft 11, an oil seal of any desired construction may be provided between the cover 21 and the shaft 11. In the present embodiment of the invention the seal is mounted on the collar 26 adapted to receive the force of the clutch shifter yoke 27, said seal including a sealing ring 28 made of leather or other suitable material, said sealing ring being kept in sealing contact with the internal walls of the extension 21a of the cover 21 by means of a spring ring 29.

Means adapted to draw the plate 18 away from the flywheel 12 are exemplified by a release mechanism including an annular actuating member 30 floatingly arranged on the shaft 11 substantially perpendicular thereto, the central opening of said member 30 being of such a size that the member 30 is permitted to change within considerable limits the angle which it forms with the axis of the shaft 11. The member 30 is provided with a plurality, in the present instance three, of radial lugs or arms 31 to which there are hingedly connected the inner ends of a corresponding number of release fingers 32.

In conventional structures release fingers visually resembling the release fingers 32 are usually fulcrumed at points intermediate their ends and, therefore, they operate as beams, that is to say, as members adapted to carry transverse loads. Such a construction of the release fingers has proved objectionable because of the high deflection resulting from the slenderness of the fingers and the high operative loads which the same have to carry in operation. In the present embodiment, the construction of the release fingers is such that they are intended to operate as members in axial compression and, since the length of the fingers 32 exceeds several times the largest dimension of its cross section, it may be stated in conformity with the usual terms of the art that the fingers 32 are adapted to function with respect to their load carrying capacity as columns.

The outer ends 32b of the fingers 32 are hingedly connected to the respective ends of a corresponding number of release levers 33. Fig. 5 illustrates the construction of one of said release levers as well as the construction of the parts of the clutch device cooperating therewith. As can be clearly seen from an examination of Fig. 5, each of said release levers 33 includes a body portion 33a slidingly fitted into the slot 34 of the pressure plate 18 and provided with a slot 35 adapted to receive the end 32b of the release finger 32, to which end 32b the end of the lever 33 is hingedly connected. The hinged connection is effected with the aid of a pin 36. On the end of the lever 33 opposite to the hinged end thereof there are provided two wings 37 the surfaces of which are adapted to bear against the surfaces 38 of the pressure plate 18.

The bottom surfaces of the lever 33 are shaped on an angle to provide a sharp edge 39. The middle portion of said edge 39 coextensive with the slot 40 formed by the wings 37 is adapted to rest, when the release mechanism is assembled, in the vertex 41 of an obtuse surface angle formed by a recess provided on the shelf portion 42 of the stud 24.

When the lever 33 and the stud 24 are assembled together, the shelf portion 42 fits into the slot 40, the wings 37 embracing the sides of said shelf portion 42. Since the angle which the front surface of the slot 40 forms with the bottom surface of the body portion 33a of the lever 33 is an acute angle and, consequently, smaller than the obtuse angle formed in the lug or shelf portion 42, the lever 33 may rock on its edge 39 through a certain predetermined angle. If a downward force is exerted by the end 32b of the release finger 32 on the hinged end of the lever 33, said lever rotates in a clockwise direction, see Figs. 3, 6 and 7, on its knife edge 39, in consequence whereof the wings 37 will press against the surfaces 38 of the pressure plate 18 and push said plate away from the flywheel 12, thereby effecting disengagement of the clutch.

The pedal mechanism for exerting the necessary force on the clutch shifter yoke 27 for disengaging the clutch is shown in Fig. 1. Referring to said figure, the mechanism comprises a pedal 45 having a stem 45a secured in the pedal lever 46 mounted on the cross shaft 47, said cross shaft carrying a crank arm 48 connected by means of an adjustable thread connection indicated generally by the numeral 49 with an arm 50 mounted on the clutch shifter yoke shaft 51. When the pedal 45 is depressed by the operator of the motor vehicle for disengaging the clutch, the parts of the pedal mechanism assume positions indicated in Fig. 1 in dotted lines, the ends of the clutch shifter yoke 27 pressing on the collar 26 and moving the same forward through a certain distance. The collar 26 carries the inner race 52a of a thrust ball bearing 52 adapted to transmit pressure directly on the annular pressure member 30 and to move the same forward, substantially longitudinally of the shaft 11.

The release fingers 32 are arranged with their outer ends 32b located slightly forward of their inner ends 32a, and therefore the movement of said ends 32a along a straight line substantially parallel to the shaft 11 produces a force acting along said fingers 32, which force is transmitted to the pin 36 of the release lever 33. In consequence of the external force being exerted on the pin 36 as described, the lever 33 operates to disengage the clutch.

Because of the hinged connection between the release fingers 32 and the pressure member 30, the fingers 32 are self-aligning and, therefore, the operative force produced by the yoke 27 is substantially evenly distributed between the separate fingers. It is important to note in this connection that by the use of three fingers it is possible to transmit substantially even releasing forces to the same number of release levers. Since one and only one plane may be passed through three points, I prefer to use three release fingers, since if a larger number of fingers, for instance four, is used, only three fingers will be self-aligning and the fourth finger may not receive any force at all. On the other hand, the use of a number less than three is unsatisfactory, because two release levers are not quite sufficient for the desirable operation of the clutch. Brackets 54 provided on the cover 21 serve for the purpose of preventing the falling out of the fingers 32 when they are removed together with the member 30 and the cover 21 in the disassembling of the clutch.

The force produced by the release fingers 32 acts along the line connecting the centers of the pins 35 and 53 which line represents the "load line" in a release finger. The operation of said force indicated by the character F is indicated in Figs. 6 and 7, wherein said force F is resolved into two component forces f and ff. With the force ff being balanced by the reaction of the stud 24 at the edge 39, the force f operates to rotate the release lever 33 in a clockwise direction around the sharp edge 39. From an examination and comparison of Figs. 6 and 7 illustrating the respective positions of the release fingers 32, release lever 33, the flywheel stud 24 and the pressure plate 18 for the engaged and the disengaged clutch respectively, it will be appreciated that the torque arm of the release lever 33 increases, as the lever moves toward the disengaged position, from the length represented by the heavy solid line in Fig. 6 to that indicated by a similar line in Fig. 7. Therefore, a much higher torque is produced by the release lever 33 at the end of the stroke of the pedal 45.

It will also be noted from an examination of Fig. 1 that as the pedal 45 approaches the position corresponding to that for the disengaged clutch, the torque arms of the crank arms 48 and 50 also increase, as can be clearly seen from an examination of said Fig. 1, wherein torque arms at the beginning of the operative stroke of the pedal 45 are indicated in heavy solid lines, while the torque arms at the end of the operative stroke of said pedal are indicated in heavy dotted lines. Such an increase of the above specified torque arms in the release mechanism of the foregoing type produces a condition where a substantially uniform force is required at the pedal 45 through the entire length of its operative stroke for disengaging the clutch.

In the embodiment of the invention illustrated in Figs. 2 to 7 inclusive, the flywheel studs 24 perform a plurality of functions, namely, they drive the pressure plate 18, provide support for the release lever 33 in a horizontal direction, provide support for the release lever in a vertical direction, and serve to locate the cover 21 which may be ground off to provide locating grooves 55 within which the lug portions 42 of the studs fit. In the modified structure illustrated in Fig. 8 the flywheel stud 56 performs only the following functions: it drives the pressure plate 18 and provides support for the release lever 33 in a horizontal direction. Support for the release lever 33 in a vertical direction is provided by the cover 21 against which the base of the release lever bears and which receives the thrust of the release finger 32 in a vertical direction.

I claim:

1. In a clutch device for a motor vehicle having a flywheel upon which the clutch device is mounted, the flywheel having a driving friction surface, a driven shaft; a driven disk mounted on said shaft; a pressure plate adapted to normally keep the driven disk in frictional engagement with the driving surface of the flywheel; a plurality of lugs on the flywheel; a release lever having a sharp edge and substantially parallel oppositely disposed surfaces supported by each lug for rocking movement on said edge; each of said levers having one of said surfaces adapted to engage said pressure plate and to push it away from the flywheel when a force spaced from said substantially parallel surfaces is applied, an annular actuating member arranged on said driven shaft and adapted to be moved longitudinally thereof; and a plurality of release fingers, each of said fingers having two ends hingedly connected respectively to said member and to a release lever, whereby a force may be transmitted from said member to the release levers.

2. In a clutch device for a motor vehicle having a flywheel upon which the clutch device is mounted; the flywheel having a driving friction surface, a driven shaft; a driven disk mounted on said shaft; a pressure plate adapted to normally maintain the driven disk in frictional engagement with the driving surface of the flywheel; a plurality of thrust receiving devices on the flywheel; a plurality of release levers, each of said levers having a part rockably supported by a thrust receiving device and having one end adapted to exert a force against said pressure plate to push it away from the flywheel when a force is applied to its other end; an annular pressure member embracing said driven shaft and adapted to be moved longitudinally thereof; a plurality of release fingers, each of said fingers having two ends hingedly connected respectively to said member and to a release lever, whereby a force may be transmitted from said member to the ends of the release levers, said lever being arranged to have the length of the torque arm of the force exerted thereon by said finger increase as the lever rocks toward the position for disengaging the clutch, and a pedal mechanism adapted to be operated by the driver of the vehicle and including a plurality of rotatable cranks the angularity of which changes to produce in combination with the increase of torque arm of the release lever a substantially uniform clutch disengaging force throughout the entire operative stroke of said pedal mechanism.

3. In a clutch device for a motor vehicle having a flywheel upon which the clutch device is mounted; the flywheel having a driving friction surface, a driven shaft; a driven disk mounted on said shaft; a pressure plate adapted to normally maintain the driven disk in frictional engagement with the driving surface of the flywheel; a plurality of thrust receiving devices on the flywheel; a plurality of release levers, each of said levers having a part rockably supported by a thrust receiving device and having a portion adapted to exert a force against said pressure plate in a direction away from said flywheel to push the pressure plate away from the flywheel when a force is applied to the other end of the lever; an annular actuating member embracing said driven shaft and adapted to be moved longitudinally thereof toward the flywheel to disengage the clutch; and a plurality of release fingers, each of said fingers having two ends hingedly connected respectively to said member and to a release lever whereby a force may be transmitted from said member to the release levers, said lever being arranged to have the length of the torque arm of the force exerted thereon by said finger increase as the lever rocks toward the position for disengaging the clutch.

4. In a clutch device for a motor vehicle having a flywheel upon which the clutch device is mounted; the flywheel having a driving friction surface, a driven shaft; a driven disk mounted on said shaft; a pressure plate adapted to normally maintain the driven disk in frictional engagement with the driving surface of the flywheel; a plurality of thrust receiving devices on the flywheel; a plurality of release levers, each of said levers having a part rockably supported by a thrust receiving device and having a portion adapted to exert a force against said pressure plate in a direction away from said flywheel to push the pressure plate away from the flywheel when a force is applied to the other end of the lever; an annular actuating member embracing said driven shaft and adapted to be moved longitudinally thereof toward the flywheel to disengage the clutch; and a plurality of release fingers, each of said fingers having two ends hingedly connected respectively to said member and to a release lever whereby a force may be transmitted from said member to the release levers, said lever being arranged to have the length of the torque arm of the force exerted thereon by said finger increase as the lever rocks toward the position for disengaging the clutch, the hinge connection of each release finger with said pressure member being located a greater distance from the flywheel than the hinge connection of the release finger with the release lever.

5. In a clutch device for a motor vehicle having a flywheel upon which the clutch device is mounted; the flywheel having a driving friction surface, a driven shaft; a driven disk mounted on said shaft; a pressure plate adapted to normally maintain the driven disk in frictional engagement with the driving surface of the flywheel; a plurality of thrust receiving devices on the flywheel; a plurality of release levers, each of said levers having at one end a relatively sharp edge rockably supported by a thrust receiving device and having a part adapted to exert a force against said pressure plate to push it away from the flywheel when a force is applied to its other end; an annular pressure member movable along said driven shaft; and a release finger between each release lever and said pressure member, each release finger being hingedly connected at one end to the pressure member and at its opposite end to the release lever, the hinge connection of each release finger with said pressure member being located a greater distance from the flywheel than the hinge connection of the release finger with the release lever.

6. A clutch device according to claim 5 in which each release lever is arranged to have the length of the torque arm of the force exerted thereon by said finger increase as the lever rocks toward the position for disengaging the clutch.

7. In a clutch mechanism, a flywheel having a friction surface, a driven shaft, a driven clutch member on the shaft, a pressure plate adapted to normally maintain the driven clutch member in frictional engagement with the flywheel, a plurality of clutch release levers arranged radially outwardly of the clutch member, each lever being slidingly arranged in recesses in the pressure plate and having at one end a part rockably supported by the flywheel and a part more remote from the flywheel than said first named part adapted to exert a force against said pressure plate in a direction away from the flywheel to push the pressure plate in said direction when a force is applied to the other end of the lever, an actuating member on the driven shaft movable toward the flywheel to disengage the clutch, and a release finger hingedly connected at one end to said actuating member and at its opposite end to a release lever, the hinge connection to the actuating member being a greater distance from the flywheel than the hinge connection to the release lever.

8. In a clutch mechanism, a flywheel having a friction surface, a driven shaft, a driven clutch member on the shaft, a pressure plate adapted to normally maintain the driven clutch member in frictional engagement with the flywheel, a plurality of clutch release levers arranged radially outwardly of the clutch member, each lever having at one end a part rockably supported by the flywheel and a part more remote from the flywheel than said first named part adapted to exert a force against said pressure plate in a direction away from the flywheel to push the pressure plate in said direction when a force is applied to the other end of the lever, an actuating member on the driven shaft movable toward the flywheel to disengage the clutch, and a release finger hingedly connected at one end to said actuating member and at its opposite end to a release lever, the hinge connection to the actuating member being a greater distance from the flywheel than the hinge connection to the release lever.

9. In a clutch mechanism, a flywheel having a friction surface, a driven shaft, a driven clutch member on the shaft, a pressure plate adapted to normally maintain the driven clutch member in frictional engagement with the flywheel, a plurality of clutch release levers arranged radially outwardly of the clutch member, each lever being slidingly arranged in recesses in the pressure plate and having at one end a relatively sharp edge rockably supported by the flywheel and a part more remote from the flywheel than said edge adapted to exert a force against said pressure plate in a direction away from the flywheel to push the pressure plate in said direction when a force is applied to the other end of the lever, an actuating member on the driven shaft movable toward the flywheel to disengage the clutch, and a release finger hingedly connected at one end to said actuating member and at its opposite end to a release lever, the hinge connection to the actuating member being a greater distance from the flywheel than the hinge connection to the release lever.

10. A clutch device according to claim 8 in which each release lever is arranged to have the length of the torque arm of the force exerted thereon by said finger increase as the lever rocks toward the position for disengaging the clutch.

11. In a clutch mechanism, a flywheel having a friction surface, a driven shaft, a driven clutch member on the shaft, a pressure plate adapted to normally maintain the driven clutch member in frictional engagement with the flywheel, a plurality of clutch release levers arranged radially outwardly of the clutch member, each lever having at one end a part rockably supported by the flywheel and a part more remote from the flywheel than said first named part adapted to exert a force against said pressure plate in a direction away from the flywheel to push the pressure plate in said direction when a force is applied to the other end of the lever, an actuating member on the driven shaft movable toward the flywheel to disengage the clutch, a release finger hingedly connected at one end to said actuating member and at its opposite end to a release lever, the hinge connection to the actuating member being a greater distance from the flywheel than the hinge connection to the release lever, and a pedal mechanism adapted to be operated by the driver of the vehicle and including a plurality of rotatable cranks the angularity of which changes to produce in combination with the increase of torque arm of the release lever a substantially uniform clutch disengaging force throughout the entire operative stroke of said pedal mechanism.

J. HAROLD MEECH.